(12) United States Patent
Cooper et al.

(10) Patent No.: US 8,331,286 B2
(45) Date of Patent: Dec. 11, 2012

(54) METHOD AND APPARATUS FOR EFFICIENT SELECTION AND ACQUISITION OF SYSTEMS UTILIZING OFDM OR SC-FDM

(75) Inventors: Rotem Cooper, San Diego, CA (US); Aamod Khandekar, San Diego, CA (US); Michael Mao Wang, San Diego, CA (US); Karthik Anantharaman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 647 days.

(21) Appl. No.: 12/181,116

(22) Filed: Jul. 28, 2008

(65) Prior Publication Data
US 2009/0059845 A1 Mar. 5, 2009

Related U.S. Application Data

(60) Provisional application No. 60/953,948, filed on Aug. 3, 2007.

(51) Int. Cl.
*H04W 72/02* (2009.01)

(52) U.S. Cl. ..................... 370/328; 455/435.2

(58) Field of Classification Search ........................ None
See application file for complete search history.

(56) References Cited

U.S. PATENT DOCUMENTS

| | | | |
|---|---|---|---|
| 6,728,233 B1 | 4/2004 | Park et al. | |
| 6,801,762 B1 * | 10/2004 | Huilgol | 455/404.1 |
| 6,957,068 B2 * | 10/2005 | Hutchison et al. | 455/435.2 |
| 7,203,158 B2 | 4/2007 | Oshima et al. | |
| 2003/0129979 A1 | 7/2003 | Cooper | |
| 2004/0235475 A1* | 11/2004 | Ishii | 455/435.3 |
| 2005/0099939 A1* | 5/2005 | Huh et al. | 370/210 |
| 2006/0079178 A1 | 4/2006 | Palin et al. | |

(Continued)

FOREIGN PATENT DOCUMENTS

CN 1633823 6/2005
(Continued)

OTHER PUBLICATIONS

International Search Report and The Written Opinion—PCT/US2008/072139, International Search Authority—European Patent Office—Apr. 2, 2009.

(Continued)

*Primary Examiner* — Min Jung
(74) *Attorney, Agent, or Firm* — Peng Zhu; S. Hossain Beladi

(57) ABSTRACT

Techniques for performing system selection and acquisition are described. In one design, a terminal may obtain at least one system record for at least one system utilizing orthogonal frequency division multiplexing (OFDM) or single-carrier frequency division multiplexing (SC-FDM). Each system record may include system identification information for an associated system and an index for an associated acquisition record. The terminal may also obtain at least one acquisition record for the at least one system. Each acquisition record may include at least one value for at least one configurable system parameter, e.g., FFT size, cyclic prefix length, number of guard subcarriers, etc. The terminal may perform acquisition for the at least one system in accordance with the at least one system record and the at least one acquisition record. The system and acquisition records may be stored in a Preferred Roaming List (PRL) or a Most Recently Used (MRU) list.

36 Claims, 9 Drawing Sheets

U.S. PATENT DOCUMENTS

| | | | |
|---|---|---|---|
| 2007/0147226 A1* | 6/2007 | Khandekar et al. | 370/208 |
| 2007/0287462 A1* | 12/2007 | Gorokhov et al. | 455/439 |
| 2008/0014937 A1* | 1/2008 | Laroia et al. | 455/435.1 |
| 2008/0182616 A1* | 7/2008 | Connors et al. | 455/552.1 |
| 2008/0293402 A1* | 11/2008 | Rajan et al. | 455/425 |
| 2009/0024728 A1* | 1/2009 | Russell | 709/223 |
| 2010/0027486 A1* | 2/2010 | Gorokhov et al. | 370/329 |
| 2010/0291924 A1* | 11/2010 | Antrim et al. | 455/433 |

FOREIGN PATENT DOCUMENTS

| | | |
|---|---|---|
| EP | 1040689 A2 | 10/2000 |
| JP | 2002016962 A | 1/2002 |
| JP | 2002271281 A | 9/2002 |
| JP | 2008547270 A | 12/2008 |
| JP | 2009514280 A | 4/2009 |
| RU | 2183387 C2 | 6/2002 |
| WO | WO0004728 | 1/2000 |
| WO | WO2006138338 A2 | 12/2006 |
| WO | WO2007026679 A1 | 3/2007 |
| WO | WO2007048478 A1 | 5/2007 |

OTHER PUBLICATIONS

TIA-683-D "Over-the-Air Service Provisioning of Mobile Stations in Spread Spectrum Standards," 3GPP2 C.S0016-C, v. 1.0 (Oct. 22, 2004).

Wang M., et al., "Update on superframe preamble structure in LBC FDD", C30-20061114-001, QUALCOMM Incorporated, Oct. 30, 2006, pp. 1-12,URL,ftp://ftp.3gpp2.org/TSGC/Working/2006/2006-12-Maui/TSG-C-2006-12- Maui/WG3/Call,%202006.11.14/C30-20061114-001_QCOM_Update_on_superframe_preamble_structure_in_LBC_FDD.pdf.

* cited by examiner

Acquisition Record — 560x

| ACQ_TYPE |
| LENGTH |
| UMB_ACQ_PROFILE |
| FFT_SIZE |
| CYCLIC_PREFIX_LENGTH |
| NUM_GUARD_SUBCARRIER |
| RESERVED |

← '00001111' for Common Acquisition Table Record for UMB

*FIG. 6A*

Acquisition Record — 560y

| ACQ_TYPE |
| LENGTH |
| NUM_UMB_BLOCKS |
| BAND_CLASS |
| CHANNEL_NUMBER |
| NUM_ACQ_TABLE_PROFILE |
| RESERVED |

← '00010000' for Generic Acquisition Record for UMB

*FIG. 6B*

METHOD AND APPARATUS FOR EFFICIENT SELECTION AND ACQUISITION OF SYSTEMS UTILIZING OFDM OR SC-FDM

The present application claims priority to provisional U.S. Application Ser. No. 60/953,948, entitled "METHOD AND APPARATUS FOR EFFICIENT SELECTION AND ACQUISITION OF OFDMA SYSTEMS", filed Aug. 3, 2007, assigned to the assignee hereof and incorporated herein by reference.

BACKGROUND

I. Field

The present disclosure relates generally to communication, and more specifically to techniques for performing system selection and acquisition by a terminal.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A terminal (e.g., a cellular phone) may be powered on or may have just lost coverage. The terminal may search for a system from which it can receive communication service. The search may be time consuming, especially if a system has one or more configurable system parameters, and each such parameter can have one of multiple possible values. In this case, the terminal may perform acquisition for different possible combinations of values for the configurable system parameters in order to detect the system. Performing acquisition for a large number of possible combinations of parameter values may extend search time and consume excessive battery power, both of which are undesirable.

SUMMARY

Techniques for performing selection and acquisition of systems utilizing orthogonal frequency division multiplexing (OFDM) and/or single-carrier frequency division multiplexing (SC-FDM) are described herein. These systems may have configurable system parameters, which may also be referred to as physical layer parameters. The configurable system parameters may affect the processing of a received signal and may make acquisition of these systems significantly more complicated than acquisition of other systems such as CDMA systems.

In an aspect, a terminal may store information for different systems and information for one or more configurable system parameters for each system. The information may be stored in a Preferred Roaming List (PRL), a Most Recently Used (MRU) list, or some other file. The terminal may use the stored information to speed up system selection and acquisition.

In one design, the terminal may identify at least one system utilizing OFDM or SC-FDM for acquisition based on a plurality of system records for a plurality of systems. The system records may be from a PRL, an MRU list, or some other source. Each system record may comprise system identification information for an associated system, an index for an associated acquisition record, preference information, etc. The terminal may perform system selection based on the preference information and/or other information in the plurality of system records. The terminal may obtain at least one system record for the at least one system from among the plurality of system records.

The terminal may also obtain at least one acquisition record for the at least one system. Each acquisition record may comprise at least one value for at least one configurable system parameter, which may include a fast Fourier transform (FFT) size, a cyclic prefix length, a number of guard subcarriers, etc. The terminal may perform acquisition for the at least one system in accordance with the at least one system record and the at least one acquisition record. The processing for acquisition may be dependent on radio technology and may include detecting for a synchronization signal or preamble, demodulating a control channel, etc. The terminal may perform a full search for all possible values of the at least one configurable system parameter if acquisition for the at least one system is unsuccessful.

Various aspects and features of the disclosure are described in further detail below.

BRIEF DESCRIPTION OF THE DRAWINGS

FIGS. 6A and 6B show two example acquisition records.

DETAILED DESCRIPTION

The techniques described herein may be used for various wireless communication systems, broadcast systems, etc. The terms "system" and "network" are often used interchangeably. The wireless communication systems may be wireless wide area network (WWAN) systems, wireless metropolitan area network (WMAN) systems, wireless local area network (WLAN) systems, etc. For example, the techniques may be used for OFDMA systems utilizing OFDM, SC-FDMA systems utilizing SC-FDM, multiple-access systems utilizing both OFDM and SC-FDM, broadcast systems utilizing OFDM, etc.

The techniques may also be used for various radio technologies. For example, the techniques may be used for OFDM-based radio technologies such as Ultra Mobile Broadband (UMB), Evolved Universal Terrestrial Radio Access (E-UTRA), IEEE 802.11 (Wi-Fi), IEEE 802.16 (WiMAX), IEEE 802.20, FLASH-OFDM®, etc. E-UTRA is part of Universal Mobile Telecommunication System (UMTS). 3GPP Long Term Evolution (LTE) is an upcoming release of UMTS that uses E-UTRA, which employs OFDMA on the forward link and SC-FDMA on the reverse link. E-UTRA, UMTS and LTE are described in documents from an organization named "3rd Generation Partnership Project" (3GPP). UMB is described in documents from an organization named "3rd Generation Partnership Project 2" (3GPP2). The techniques may also be used for OFDM-based broadcast technologies such as MEDIAFLO™, Digital Video Broadcasting for Handhelds (DVB-H), Integrated Services Digital Broadcasting for Terrestrial Television Broadcasting (ISDB-T), etc. For clarity, certain aspects of the techniques are described below for UMB, and UMB terminology is used in much of the description below.

Figure 1:
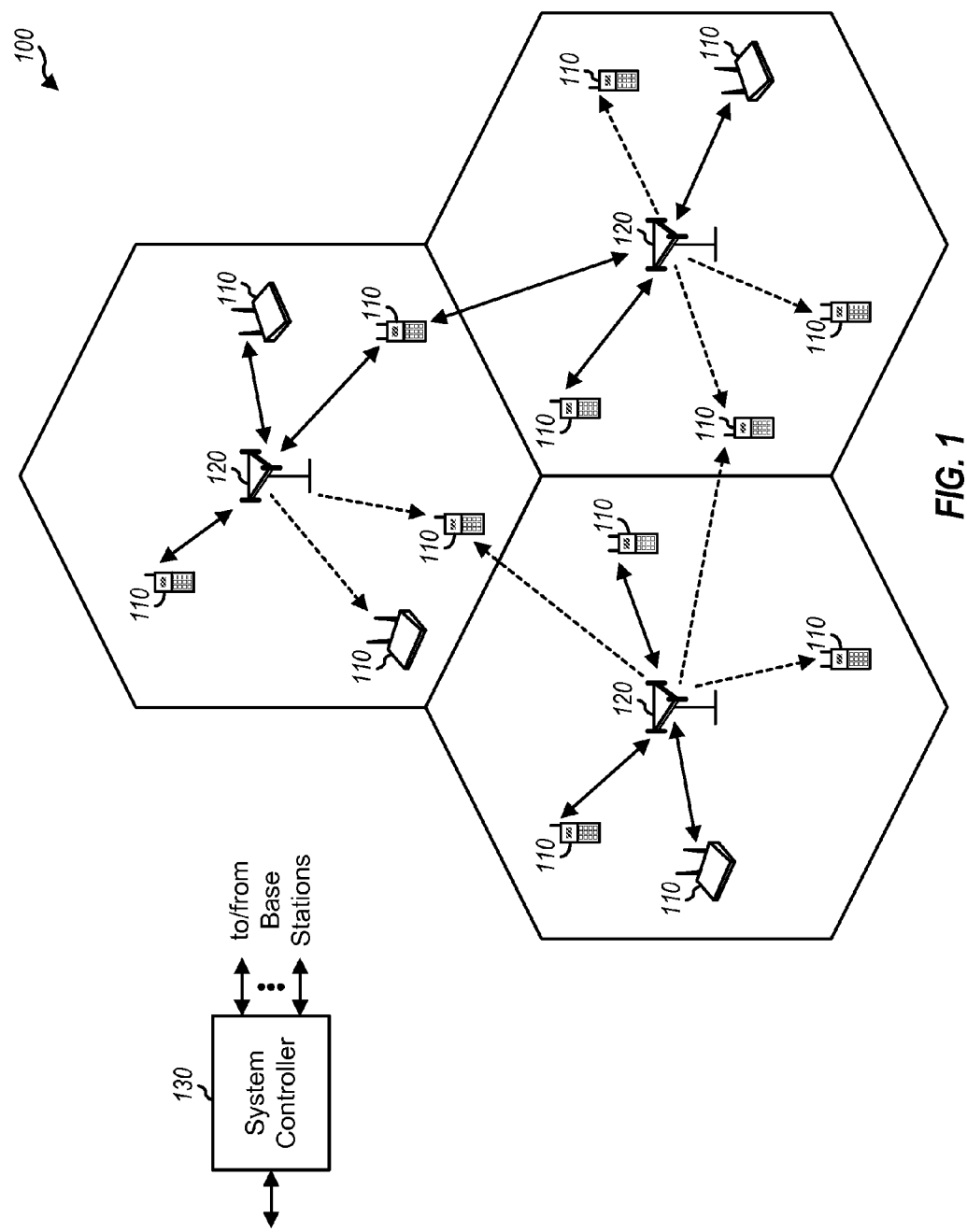
FIG. 1 shows a wireless communication system.

FIG. 1 shows a wireless communication system 100, which may include any number of base stations 120. A base station is a station that communicates with the terminals and may also be referred to as an access point, a Node B, an evolved Node B, etc. A system controller 130 may couple to a set of base stations and provide coordination and control for these base stations.

Terminals 110 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless communication device, a wireless modem, a handheld device, a laptop computer, a cordless phone, a broadcast receiver, etc. A terminal may communicate with a base station on the forward and reverse links. The forward link (or downlink) refers to the communication link from the base station to the terminal, and the reverse link (or uplink) refers to the communication link from the terminal to the base station. In FIG. 1, a solid line with double arrows indicates communication between a terminal and a base station. A broken line with a single arrow indicates a terminal receiving a forward link signal from a base station. A terminal may perform system search and other functions based on the forward link signals transmitted by the base stations.

Figure 2:
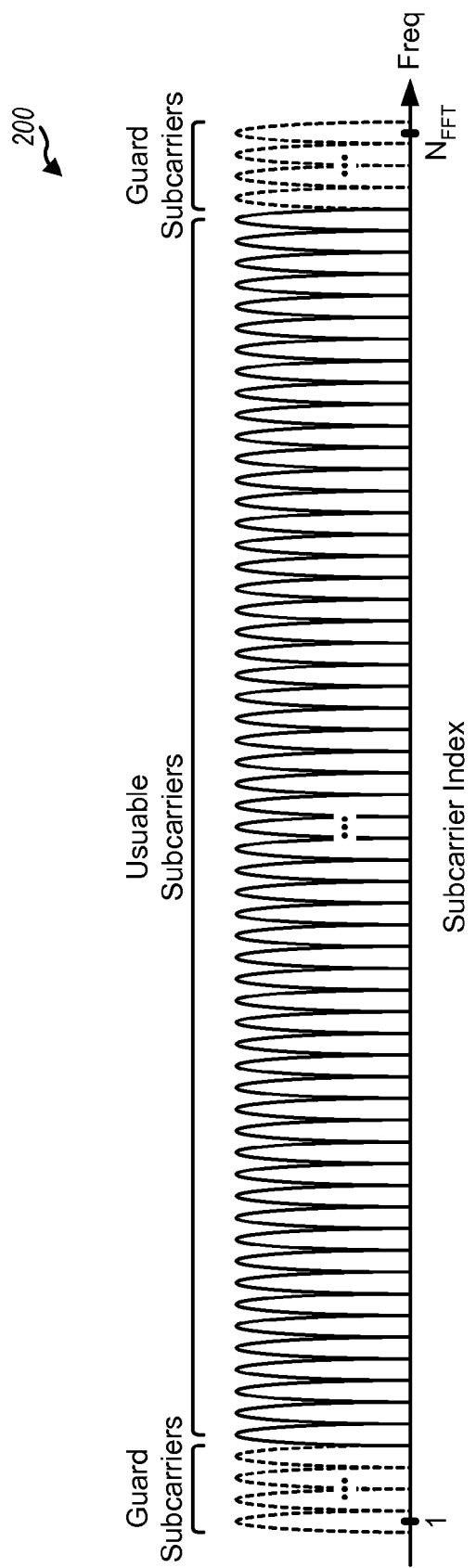
FIG. 2 shows a subcarrier structure for OFDM or SC-FDM.

FIG. 2 shows a subcarrier structure 200 that may be applicable for OFDM or SC-FDM. A system may have an overall system bandwidth of W MHz. The system bandwidth may be partitioned into multiple ($N_{FFT}$) orthogonal subcarriers using OFDM or SC-FDM. These subcarriers may also be referred to as tones, bins, etc. $N_{FFT}$ is commonly referred to as the FFT size. The spacing between adjacent subcarriers is $W/N_{FFT}$ MHz. The subcarrier spacing may be fixed, and the total number of subcarriers ($N_{FFT}$) may be dependent on the system bandwidth. For example, in UMB and LTE, $N_{FFT}$ may be equal to 128, 256, 512, 1024 or 2048 for system bandwidth of 1.25, 2.5, 5, 10 or 20 MHz, respectively. The FFT size may thus be indicative of the system bandwidth. Alternatively, the total number of subcarriers ($N_{FFT}$) may be configurable for a given system bandwidth. For example, in DVB-H, $N_{FFT}$ may be equal to 2048 or 8192 for system bandwidth of 6 or 7 MHz. In any case, $N_{FFT}$ may be a configurable parameter for the system.

In a spectrally shaped system, only $N_U$ subcarriers among the $N_{FFT}$ total subcarriers may be usable for transmission, and the remaining $N_G$ subcarriers may be unused and serve as guard subcarriers, where $N_U + N_G = N_{FFT}$. The $N_U$ usable subcarriers may be located in the middle of the system bandwidth, and the $N_G$ guard subcarriers may be located at the two band edges. Although not shown in FIG. 2 for simplicity, the center/DC subcarrier may also be a guard subcarrier. The guard subcarriers at the band edges may allow the system to meet spectral mask requirements.

Figure 3:
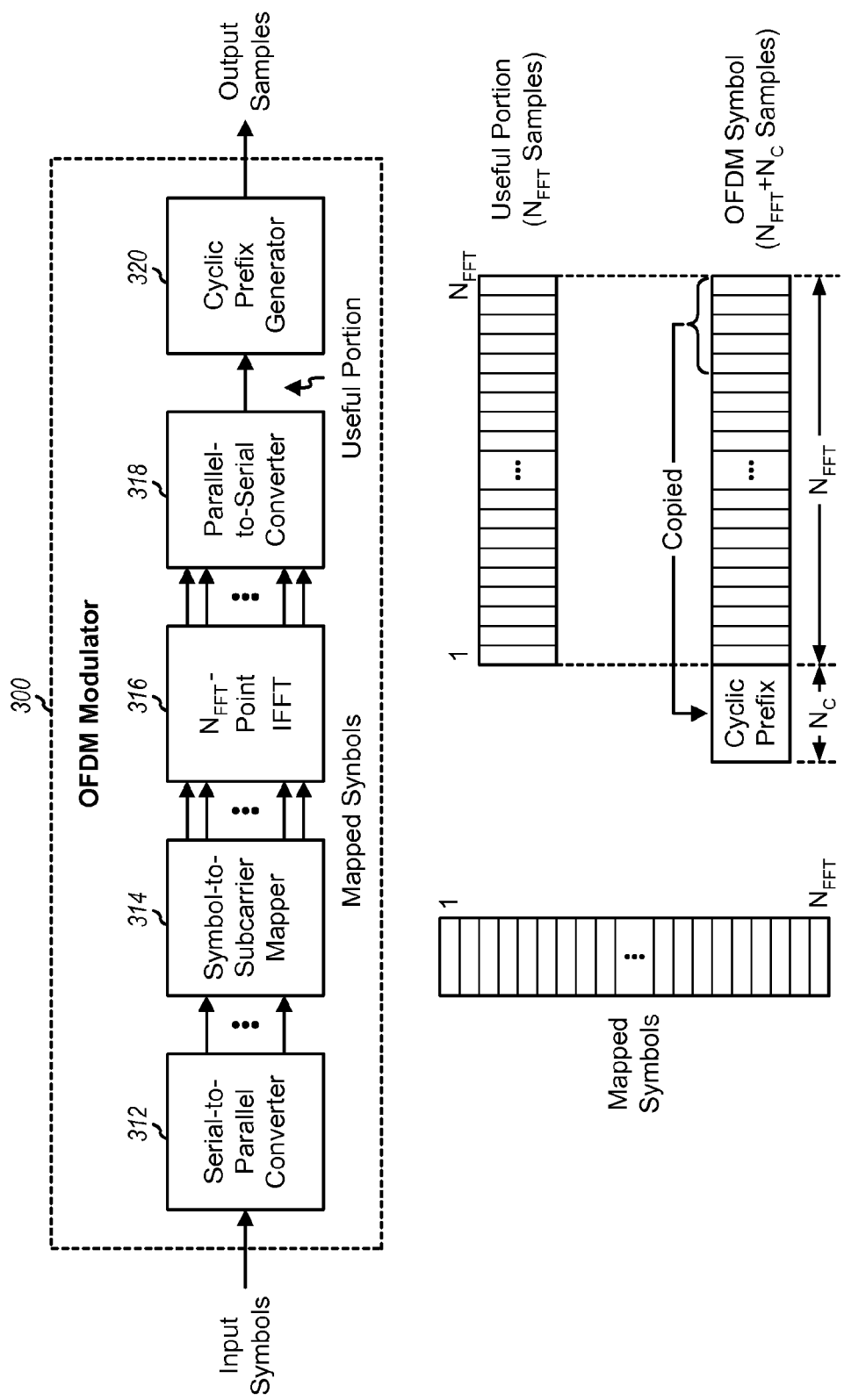
FIG. 3 shows a block diagram of an OFDM modulator.

FIG. 3 shows a block diagram of an OFDM modulator 300 for a transmitter in an OFDM-based system. Within OFDM modulator 300, a serial-to-parallel converter 312 may receive input symbols (e.g., modulation symbols) and may provide these input symbols in parallel form. A symbol-to-subcarrier mapper 314 may map the input symbols to K subcarriers used for transmission and may map zero symbols with signal value of zero to the remaining $N_{FFT} - K$ subcarriers. An inverse FFT (IFFT) unit 316 may receive the $N_{FFT}$ mapped symbols for the $N_{FFT}$ total subcarriers in one OFDM symbol period. IFFT unit 316 may transform the $N_{FFT}$ mapped symbols to the time domain with an $N_{FFT}$-point IFFT and provide $N_{FFT}$ time-domain samples. Each sample is a complex value to be sent in one sample period. A parallel-to-serial converter 318 may serialize the $N_{FFT}$ samples and provide a useful portion containing these samples. A cyclic prefix generator 320 may copy the last $N_C$ samples of the useful portion and append these $N_C$ samples to the front of the useful portion to obtain an OFDM symbol containing $N_{FFT} + N_C$ samples. The copied portion is referred to as a cyclic prefix or a guard interval, and $N_C$ is the cyclic prefix length. The cyclic prefix is used to combat inter-symbol interference (ISI) caused by frequency selective fading.

A system may have a configurable total number of subcarriers ($N_{FFT}$), a configurable cyclic prefix length ($N_C$), a configurable number of guard subcarriers ($N_G$), etc. A terminal may need to know the values of $N_{FFT}$, $N_C$ and $N_G$ used by the system in order to acquire a signal transmitted by the system. If the terminal does not know the values of $N_{FFT}$, $N_c$ and $N_G$ used by the system (e.g., during system search), then the terminal may perform acquisition for each possible combination of values that can be used by the system. For example, if there are $K_{FFT}$ possible values for $N_{FFT}$, $K_C$ possible values for $N_C$, and $K_G$ possible values for $N_G$, then there are $K_{total} = K_{FFT} \times K_C \times K_G$ possible combinations of values for $N_{FFT}$, $N_C$ and $N_G$. The terminal may then perform acquisition for each of the $K_{total}$ possible combinations of values, which may consume excessive battery power and time.

In an aspect, a terminal may store information for different systems and information for one or more configurable system parameters for each system. The terminal may use the stored information to speed up system selection and acquisition. In one design, the information may be stored in a PRL, which may be provisioned on the terminal (e.g., during service activation), downloaded to the terminal (e.g., via over-the-air programming during operation), or provided to the terminal by a removable module inserted into the terminal. In another design, the information may be collected by the terminal and stored in an MRU list. For both designs, the information may be stored in a non-volatile memory on or accessible to the terminal and may be used to speed up acquisition and save time and battery power. For clarity, storage of the information in a PRL is described below.

Figure 4:
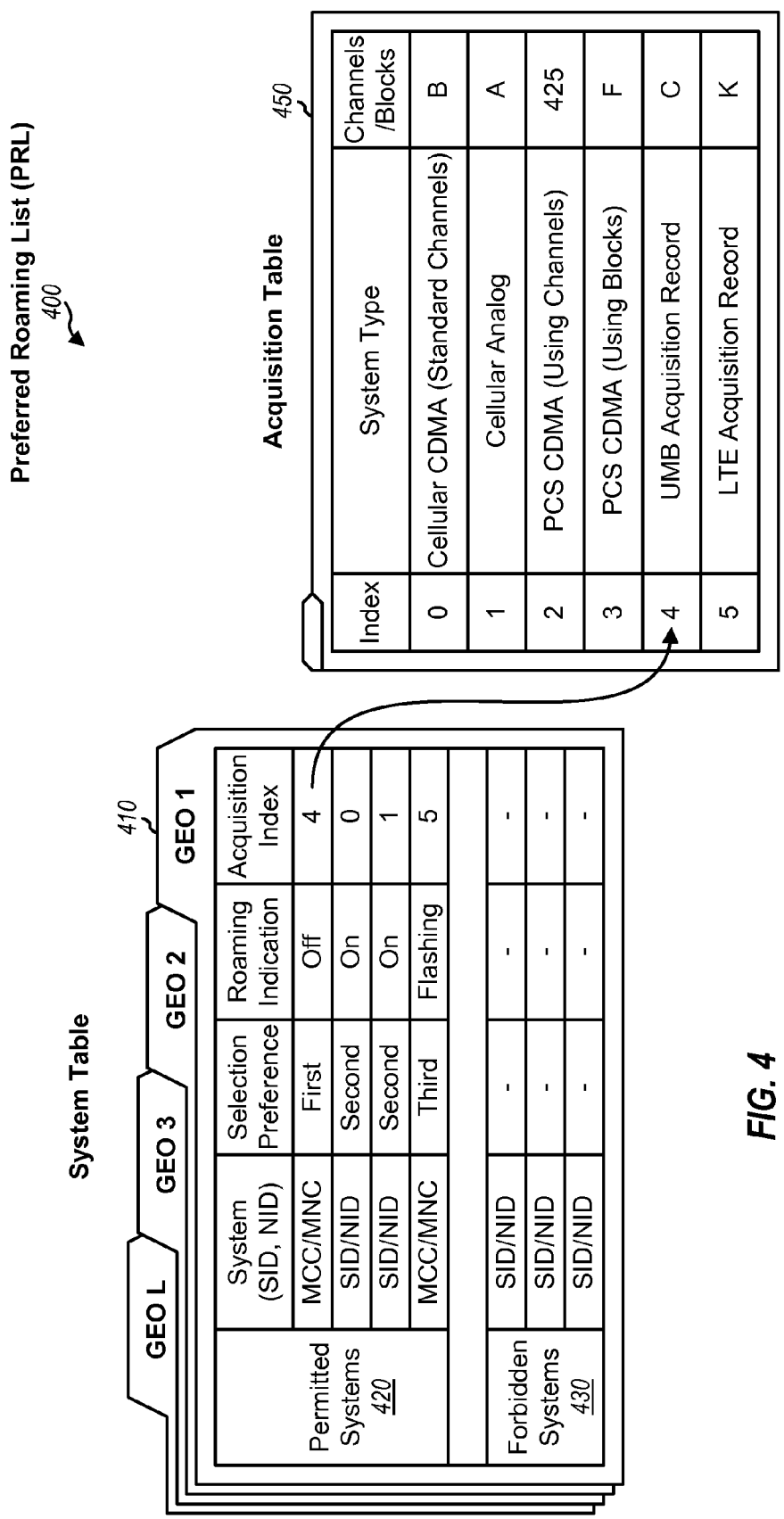
FIG. 4 shows a PRL.

FIG. 4 shows a PRL 400 having the structure described in ANSI/TIA-683-D, entitled "Over-the-Air Service Provisioning of Mobile Stations in Spread Spectrum Systems", April 2005, which is publicly available. PRL 400 includes a system table 410 and an acquisition table 450. System table 410 includes a list of permitted/preferred and forbidden systems, which is organized by geographic areas (GEOs). For clarity, FIG. 4 shows each geographic area being represented by a respective tabbed table. Each tabbed table includes a section 420 for permitted systems that a terminal should access and a section 430 for forbidden systems that the terminal should not access.

The system table and the acquisition table may have different formats for different radio technologies. FIG. 4 shows a PRL format that may be applicable for cdma2000, UMB, etc. The tabbed table for each geographic area includes (1) one or more records for one or more systems in the geographic area and (2) multiple fields for pertinent information for each record. These fields include a system field, a selection preference field, a roaming indication field, and an acquisition index field. For each record, the system field stores system identification information for a system associated with that record. The selection preference field indicates the preference for the associated system among all of the permitted systems within the same geographic area. A network operator typically specifies the preference. The roaming indication field specifies how a roaming indicator on the terminal should be displayed when receiving a signal from the associated system. The acquisition index field stores an index value that points to a specific record in acquisition table 450 containing the parameter values to use to acquire the associated system. Acquisition table 450 includes one record for each unique index value. Each acquisition record includes fields for various parameters used for system acquisition. The acquisition records for different radio technologies may have different formats.

As shown in FIG. 4, the system identification information in each system record may include a pair of system identification (SID) and network identification (NID), a pair of mobile country code (MCC) and mobile network code (MNC), a public land mobile network identity (PLMNID), and/or other information. SID and NID are commonly used for 3GPP2 systems. MCC and MNC are commonly used for 3GPP and 3GPP2 systems. PLMNID is commonly used for 3GPP systems. MCC is defined by the International Telecommunications Union (ITU) as a three-digit code that can identify the country in which a system is deployed. Each country is assigned one or more MCC values by the ITU in Recommendation E.212, which is publicly available. For example, the United States is assigned MCC values of 310 through 316. MNC is also defined by the ITU as a two or three-digit code. A combination of an MCC and an MNC may be used to identify a network operator within a country.

FIG. 4 shows a graphical representation of a PRL for one or more radio technologies. The PRL may have different formats for different radio technologies. Regardless of the format, the PRL may be stored in a file.

ANSI/TIA-683-D defines two categories of PRL—a "Preferred Roaming List" and an "Extended Preferred Roaming List". The Extended Preferred Roaming List has additional capabilities over the Preferred Roaming List.

Figure 5:
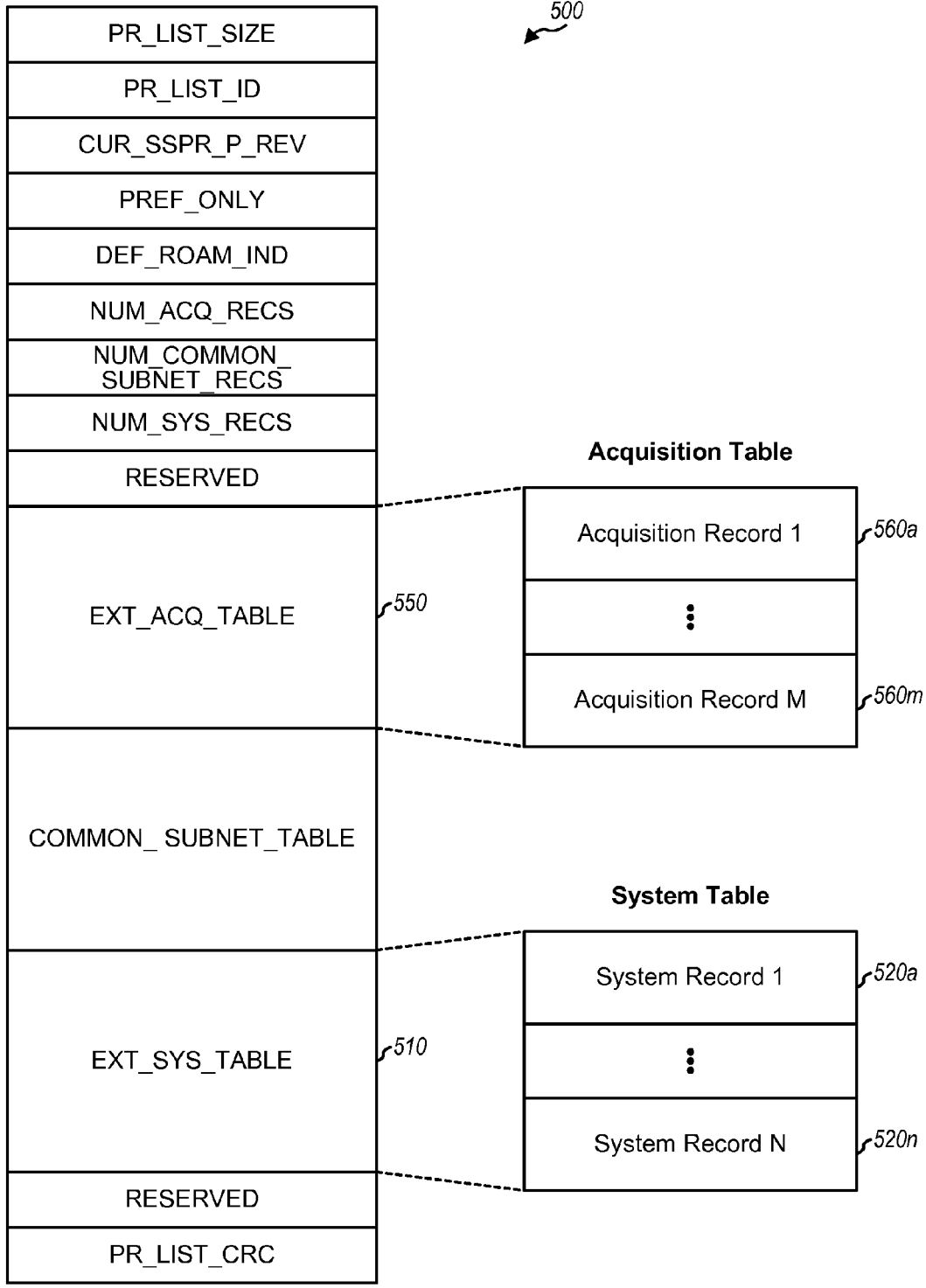
FIG. 5 shows a file containing a PRL.

FIG. 5 shows a file 500 containing a PRL, which has the format of the Extended Preferred Roaming List described in ANSI/TIA-683-D. The PRL contains a number of fields, as shown in FIG. 5. Table 1 provides a short description for each field in the PRL.

As shown in FIG. 5, the PRL includes (i) a system table 510 composed of N system records 520a through 520n and (ii) an acquisition table 550 composed of M acquisition records 560a through 560m. In general, M and N may each be any integer value. Each system record 520 and each acquisition record 560 may have the format described below.

Different types of acquisition record may be defined for different radio technologies and may be assigned unique values. Table 2 lists some acquisition record types and an assigned value for each type, in accordance with one design. IS-95, IS-2000, and High Rate Packet Data (HRPD) are part of the cdma2000 family of standards. Global System for Mobile Communications (GSM) is a widely deployed radio technology for TDMA. In the design shown in Table 2, an acquisition record type of "Generic Acquisition Record for UMB" may be defined for UMB and may be assigned a value of '00010000' (binary). Another acquisition record type of "Common Acquisition Table Record for UMB" may also be defined for UMB and may be assigned a value of '00001111'. A complete set of UMB acquisition parameters may be included in a Generic Acquisition Record for UMB and a Common Acquisition Table Record for UMB. Additional acquisition record types may be defined for other OFDM-based radio technologies such as LTE, WiMAX, Wi-Fi, MEDIAFLO™, DVB-H, etc.

TABLE 2

Acquisition Record Type Values

| Acquisition Record Type | Value |
| --- | --- |
| Reserved | '00000000' |
| Cellular Analog | '00000001' |
| Cellular CDMA (Standard Channels) | '00000010' |
| Cellular CDMA (Custom Channels) | '00000011' |
| Cellular CDMA Preferred | '00000100' |
| PCS CDMA (Using Blocks) | '00000101' |
| PCS CDMA (Using Channels) | '00000110' |
| JTACS CDMA (Standard Channels) | '00000111' |
| JTACS CDMA (Custom Channels) | '00001000' |
| 2 GHz Band (Using Channels) | '00001001' |
| Generic Acquisition Record for IS-2000 and IS-95 | '00001010' |
| Generic Acquisition Record for HRPD | '00001011' |
| Generic Acquisition Record for GSM | '00001100' |

TABLE 1

PRL

| Field | Length (bits) | Description |
| --- | --- | --- |
| PR_LIST_SIZE | 16 | Indicate the total size of the PRL in octets. |
| PR_LIST_ID | 16 | Contain an identification (ID) assigned to the PRL. |
| CUR_SSPR_P_REV | 8 | Indicate a protocol revision of the PRL. |
| PREF_ONLY | 1 | Indicate whether to operate only in preferred systems. |
| DEF_ROAM_IND | 8 | Indicate a default roaming indication. |
| NUM_ACQ_RECS | 9 | Indicate the number of acquisition records in the PRL. |
| NUM_COMMON_SUBNET_RECS | 9 | Indicate the number of common subnet records in the PRL. |
| NUM_SYS_RECS | 14 | Indicate the number of system records in the PRL. |
| RESERVED | 7 | Contain padding bits for an integer number of octets. |
| EXT_ACQ_TABLE | variable | Contain the acquisition records. |
| COMMON_SUBNET_TABLE | variable | Contain the common subnet records. |
| EXT_SYS_TABLE | variable | Contain the system records. |
| RESERVED | 0 to 7 | Contain padding bits for an integer number of octets. |
| PR_LIST_CRC | 16 | Carry a 16-bit CRC value for the PRL. |

TABLE 2-continued

Acquisition Record Type Values

| Acquisition Record Type | Value |
|---|---|
| Generic Acquisition Record for UMTS | '00001101' |
| Generic GSM/UMTS Preferred | '00001110' |
| Common Acquisition Table Record for UMB | '00001111' |
| Generic Acquisition Record for UMB | '00010000' |
| Reserved | All other values |

FIG. 6A shows a design of a Common Acquisition Table Record for UMB 560x, which may be one of the M acquisition records 560a through 560m in acquisition table 550 in FIG. 5. Common Acquisition Table Record for UMB 560x may be used to acquire a UMB system. Table 3 provides a short description for each field of Common Acquisition Table Record for UMB 560x. The ACQ_TYPE and LENGTH fields may be common for all acquisition record types. The remaining fields may be used for UMB specific parameters.

In one design, the UMB_ACQ_PROFILE field may be set to a number that is unique to and may be used to index the Common Acquisition Table Record for UMB. This index may be used by a Generic Acquisition Record for UMB to reference the Common Acquisition Table Record for UMB.

In one design, the FFT_SIZE field may be set to a value given by $\log_2(N_{FFT}/128)$. In this design, the FFT_SIZE field may be set to 0 for $N_{FFT}=128$, to 1 for $N_{FFT}=256$, to 2 for $N_{FFT}=512$, to 3 for $N_{FFT}=1024$, to 4 for $N_{FFT}=2048$, etc. The FFT_SIZE field may also be set in other manners.

In one design, the CYCLIC_PREFIX_LENGTH field may be set to an $N_{CP}$ value of 1, 2, 3 or 4. The cyclic prefix length may be given as $N_C=N_{CP}\times N_{FFT}/16$. In this design, the cyclic prefix length may be equal to 1/16, 1/8, 3/16 or 1/4 of the FFT size for $N_{CP}$ values of 1, 2, 3 or 4, respectively. The CYCLIC_PREFIX_LENGTH field may also be set in other manners.

In one design, the NUM_GUARD_SUBCARRIER field may be set to the number of subcarriers that are designated as guard subcarriers in a forward channel. In another design, different numbers of guard subcarriers may be mapped to different values for the NUM_GUARD_SUBCARRIER field, e.g., in similar manner as the FFT_SIZE field.

In one design, a given field may be set to a designated value (e.g., all ones binary) to indicate that no parameter value is specified for this field. In this case, a terminal may perform acquisition for all possible values for the parameter. For example, if the FFT_SIZE field is set to the designated value, then the terminal may perform acquisition for each of five possible FFT sizes of 128, 256, 512, 1024 and 2048.

TABLE 3

Common Acquisition Table Record for UMB

| Field | Length (bits) | Description |
|---|---|---|
| ACQ_TYPE | 8 | Set to '00001111' for Common Acquisition Table Record for UMB. |
| LENGTH | 8 | Indicate the length of the following fields in the record in octets. |
| UMB_ACQ_PROFILE | 6 | This field is set to a unique 6-bit number that specifies a set of UMB acquisition fields (one FFT_SIZE field, one CYCLIC_PREFIX_LENGTH field, and one NUM_GUARD_SUBCARRIERS field). UMB_ACQ_PROFILE is used by the Generic Acquisition Record for UMB for specifying the set of UMB acquisition parameters. The value '111111' is reserved The Common Acquisition Table Records for UMB should be listed in order of increasing UMB_ACQ_PROFILE values. |
| FFT_SIZE | 4 | Indicate the FFT size used by the system. |
| CYCLIC_PREFIX_LENGTH | 3 | Indicate the cyclic prefix length. |
| NUM_GUARD_SUBCARRIER | 7 | Indicate the number of guard subcarriers. |
| RESERVED | variable | The length of this field is the smallest number of bits used to make the total length of the Common Acquisition Table Record for UMB an integer multiple of octets. The value of this field is set to zero. |

FIG. 6B shows a design of a Generic Acquisition Record for UMB 560y, which may be one of the M acquisition records 560a through 560m in acquisition table 550 in FIG. 5. Generic Acquisition Record for UMB 560y may be used to acquire a UMB system. Table 4 provides a short description for each field of Generic Acquisition Record for UMB 560y. In one design, the NUM_UMB_BLOCKS field may be used to specify the number of UMB blocks included in the Generic Acquisition Record for UMB. In one design, the UMB_ACQ_TABLE_PROFILE field may include an index for a Common Acquisition Table Record for UMB and is essentially a pointer to the Common Acquisition Table Record for UMB.

TABLE 4

Generic Acquisition Record for UMB

| Field | Length (bits) | Description |
|---|---|---|
| ACQ_TYPE | 8 | Set to '00010000' for Generic Acquisition Record for UMB. |
| LENGTH | 8 | Indicate the length of the following fields in the record in octets. |
| NUM_UMB_BLOCKS | 6 | This field is set to the number of UMB blocks included in this record. |
| BAND_CLASS | 8 | Indicate the band class number corresponding to the frequency assignment of the channel specified by this record. |
| CHANNEL_NUMBER | 16 | Indicate the channel number corresponding to the band class specified by this record. |
| UMB_ACQ_TABLE_PROFILE | 6 | This field is set to the value of the UMB_ACQ_PROFILE in a Common Acquisition Record for UMB, to include the desired set of UMB acquisition parameters in that Common Acquisition Table Record for UMB in the Generic Acquisition Record for UMB. The value '111111' indicates that the Common Acquisition Table Record for UMB can be ignored. |
| RESERVED | variable | The length of this field is the smallest number of bits used to make the total length of the Generic Acquisition Record for UMB an integer multiple of octets. The value of this field is set to zero. |

FIGS. 6A and 6B show one design of UMB acquisition records. Table 3 lists common parameters that may be shared by different Generic Acquisition Record for UMB. These parameters include FFT_SIZE, CYCLIC_PREFIX_LENGTH, and NUM_GUARD_SUBCARRIERS. Table 4 specifies the band class and channel of a particular UMB system and an index that refers to a specific Common Acquisition Table Record for UMB. The use of the Common Acquisition Table Record for UMB may save duplication of common fields in the PRL.

Different types of system record may be defined for different types of system and may be assigned unique values. Table 5 lists some system record types and an assigned value for each type. In the design shown in Table 5, a system record type of "MCC-MNC based System Record" may be used for UMB and may be assigned a value of '0011' (binary). Additional system record types may also be defined for other systems.

TABLE 5

System Record Type Values

| System Record Type | Value |
|---|---|
| IS-2000 and IS-95 Systems | '0000' |
| HRPD System | '0001' |
| PLMN-based System Record | '0010' |
| MCC-MNC based System Record | '0011' |

Figure 7:
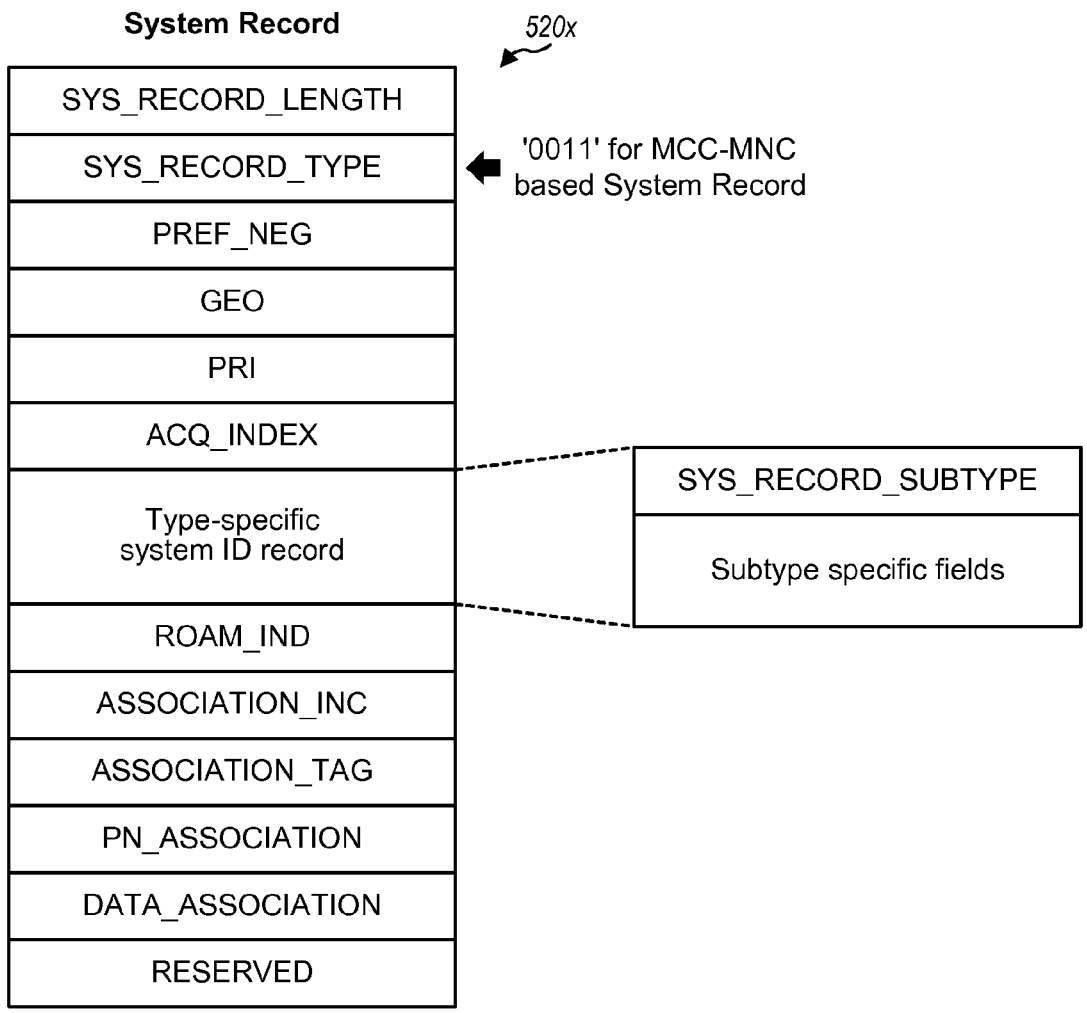
FIG. 7 shows an example system record.

FIG. 7 shows a design of an UMB system record 520x, which may be one of the N system records 520a through 520n in system table 510 in FIG. 5. UMB system record 520x may be used to select a UMB system.

Table 6 provides a short description for each field of a system record. The "Type-specific system ID record" field may be specific for each system record type whereas the remaining fields may be common for all system record types.

TABLE 6

System Record

| Field | Length (bits) | Description |
|---|---|---|
| SYS_RECORD_LENGTH | 5 | Indicate the length of the system record in octets. |
| SYS_RECORD_TYPE | 4 | Set to '0011' for the MCC-MNC based System Record. |
| PREF_NEG | 1 | Indicate if operating on the system is permitted ('1') or forbidden ('0'). |
| GEO | 1 | Indicate geographical area of the system. |
| PRI | 1 | Indicate the preference for the system. |
| ACQ_INDEX | 9 | Contain an index that points to an acquisition record for the system. |
| Type-specific system ID record | variable | Contain fields specific for the MCC-MNC based System Record. See Table 7. |
| ROAM_IND | 0 or 8 | Indicate a roaming indication. |

TABLE 6-continued

System Record

| Field | Length (bits) | Description |
|---|---|---|
| ASSOCIATION_INC | 1 | Indicate whether the system record contains the next three fields. |
| ASSOCIATION_TAG | 0 or 8 | Contain an association tag. |
| PN_ASSOCIATION | 0 or 1 | Identify systems with the same PN assignment. |
| DATA_ASSOCIATION | 0 or 1 | Identify systems with the same IP gateways. |
| RESERVED | variable | Contain padding bits. |

Table 7 provides a short description for each field of the type-specific system ID record for the MCC-MNC based System Record.

TABLE 7

Fields of Type-specific system ID record

| Field | Length (bits) | Description |
|---|---|---|
| SYS_RECORD_SUBTYPE | 3 | Set to one of the values given in Table 8. |
| Subtype dependent fields | variable | Include a set of fields that is dependent on the SYS_RECORD_SUBTYPE value. |

Table 8 lists the possible values for the SYS_RECORD_SUBTYPE field in FIG. 7 and Table 7.

TABLE 8

SYS_RECORD_SUBTYPE Values

| Parameter Description | Value |
|---|---|
| MCC, MNC only | '000' |
| MCC, MNC and multiple SIDs included | '001' |
| MCC, MNC and multiple SIDs, NIDs included | '010' |
| All other values | Reserved |

Table 9 lists the Subtype dependent fields for the case in which the SYS_RECORD_SUBTYPE value is '000'.

TABLE 9

Subtype dependent fields for SYS_RECORD_SUBTYPE = '000'

| Field | Length (bits) | Description |
|---|---|---|
| MCC | 12 | MCC of the country in which the system is deployed. |
| MNC | 12 | MNC of the system network operator. |

Table 10 lists the Subtype dependent fields for the case in which the SYS_RECORD_SUBTYPE value is '001'.

TABLE 10

Subtype dependent fields for SYS_RECORD_SUBTYPE = '001'

| Field | Length (bits) | Description |
|---|---|---|
| MCC | 12 | MCC of the country in which the system is deployed. |
| MNC | 12 | MNC of the system network operator. |
| RESERVED | 4 | RESERVED |

TABLE 10-continued

Subtype dependent fields for SYS_RECORD_SUBTYPE = '001'

| Field | Length (bits) | Description |
|---|---|---|
| NUM_SID | 4 | Number of SIDs included |
| NUM_SID occurrences of the following field | | |
| SID | 16 | SID of the system. |

Table 11 lists the Subtype dependent fields for the case in which the SYS_RECORD_SUBTYPE value is '010'.

TABLE 11

Subtype dependent fields for SYS_RECORD_SUBTYPE = '010'

| Field | Length (bits) | Description |
|---|---|---|
| MCC | 12 | MCC of the country in which the system is deployed. |
| MNC | 12 | MNC of the system network operator. |
| Reserved | 4 | Reserved bit |
| NUM_SID_NID | 4 | Number of SID, NID fields included in the record. |
| NUM_SID_NID occurrences of the following two fields | | |
| SID | 16 | SID of the system. |
| NID | 16 | NID of the system. |

Tables 5 to 11 show a specific design of a system record that may be used for UMB. A system record for UMB may also include different and/or additional fields.

For clarity, system and acquisition records for UMB have been described above. System and acquisition records for other radio technologies and systems utilizing OFDM and/or SC-FDM may be defined in similar manner. For example, system and acquisition records may be defined for LTE, WiMAX, etc. In general, the system and acquisition records for each radio technology/system may include any number of fields for any type of information that may be used for selection and acquisition of that radio technology/system.

In one design, the system and acquisition records for OFDM-based and SC-FDM-based systems may be backward compatible with TIA-683-D. A terminal that supports TIA-683-D (which is called a legacy terminal) may be able to extract the records for cdma2000 and other systems from the PRL and may ignore or discard the records for OFDM-based and SC-FDM-based systems. A new terminal that supports the new system and acquisition records may be able to extract these records from the PRL and may use these records for selection and acquisition of the OFDM-based and SC-FDM-based systems.

In another design, the system and acquisition records for OFDM-based and SC-FDM-based systems may be stored in a format that is not backward compatible with TIA-683-D. In this design, only information pertinent for OFDM-based and SC-FDM-based systems may be stored, and non-pertinent fields may be omitted.

A terminal may be provisioned with a PRL, which may be generated by a service provider with which the terminal has a service subscription. The PRL may include a number of system records for systems that may be received by the terminal. These systems may include a home system and other systems for which the service provider has roaming agreements. Each system record may include system identification information and/or other pertinent information and may also include an index for an acquisition record. The acquisition record may include pertinent information used to expedite acquisition of the associated system. The number of system records and the number of acquisition records may be dependent on system deployment.

Alternatively or additionally, the terminal may maintain an MRU list, which may include pertinent information for acquired systems and their configurable parameters. The terminal may generate system and acquisition records for each system acquired by the terminal and may thereafter use these records to acquire the system.

The terminal may perform acquisition for one or more systems in the PRL and/or the MRU list, e.g., at power up or when the terminal is out of service. The terminal may identify the one or more systems based on preference information and/or other information in the system records in the PRL and/or the MRU list. The terminal may order the systems based on their preference in the PRL, based on when the systems were last acquired, etc. In one design, the terminal may perform acquisition for each system (e.g., in the arranged order) using only the parameter values in the acquisition record for that system. This may greatly speed up acquisition since the terminal can avoid performing acquisition for all possible combination of parameter values. The system and acquisition records may allow the terminal to more quickly conclude whether service is available. The terminal may perform acquisition periodically, e.g., every T1 seconds, where T1 may be selected based on various factors such as battery life and system acquisition speed.

The terminal may also perform a full search, e.g., if acquisition for the one or more systems based on one or more acquisition records is unsuccessful. For the full search, the terminal may perform acquisition for all or many possible combinations of parameter values and may also perform acquisition for all possible systems. The terminal may perform a full search periodically, e.g., every T2 seconds, where T2 may be larger than T1. T1 and T2 may also be dependent on whether the terminal is looking for service on any system or is searching for a better system.

Figures 8, 9:
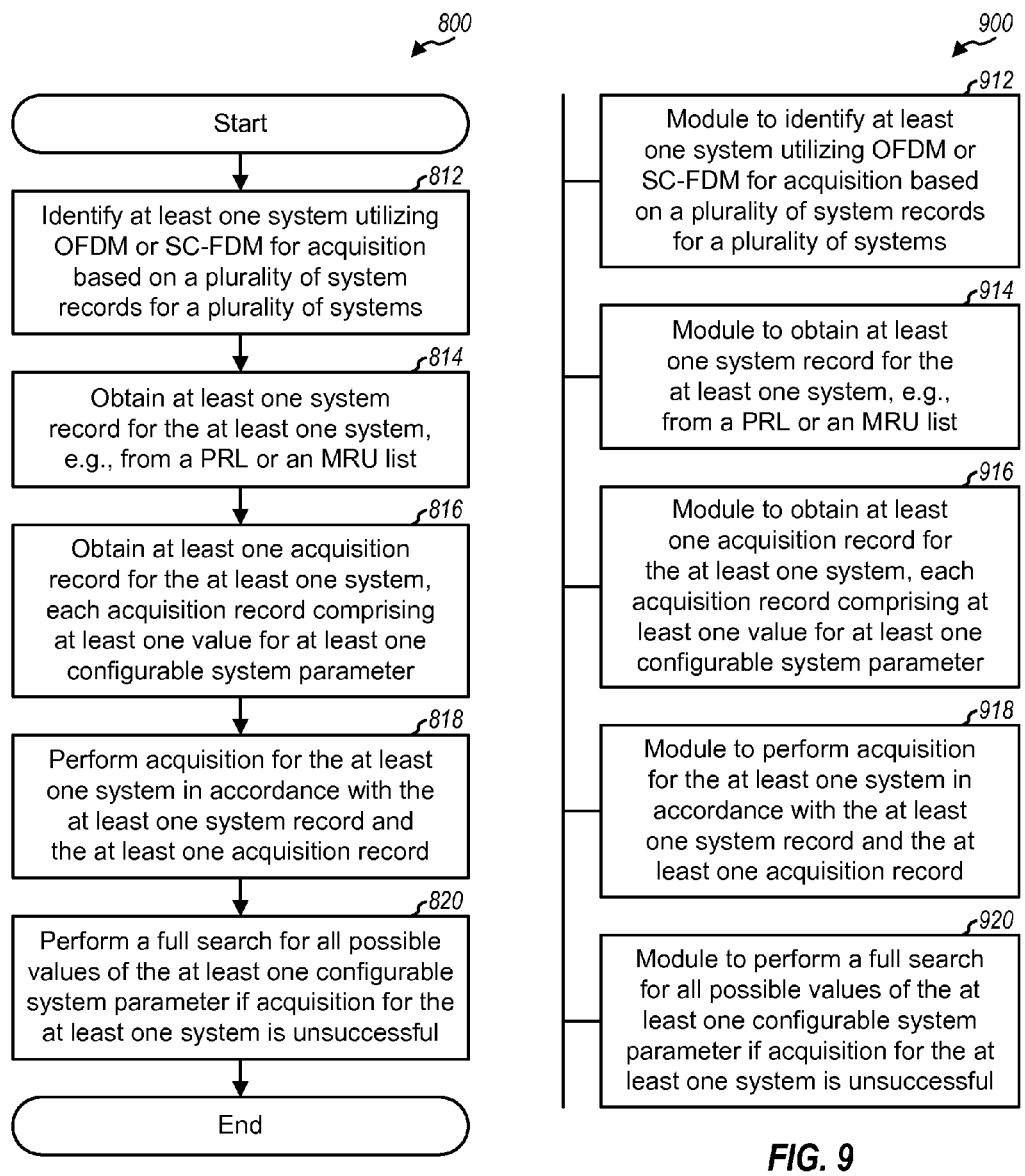
FIG. 8 shows a process for performing system selection and acquisition.
FIG. 9 shows an apparatus for performing system selection and acquisition.

FIG. 8 shows a design of a process 800 for performing system selection and acquisition by a terminal. The terminal may initially identify at least one system utilizing OFDM or SC-FDM for acquisition based on a plurality of system records for a plurality of systems (block 812). The plurality of system records may be from a PRL, an MRU list, or some other source. Each system record may comprise system identification information for an associated system, an index for an associated acquisition record, preference information, etc. The terminal may perform system selection in block 812 based on the preference information and/or other information in the plurality of system records. The terminal may obtain at least one system record for the at least one system from among the plurality of system records (block 814).

The terminal may also obtain at least one acquisition record for the at least one system (block 816). Each acquisition record may comprise at least one value for at least one configurable system parameter. The at least one configurable system parameter may comprise an FFT size, a cyclic prefix length, the number of guard subcarriers, and/or other parameters. The at least one acquisition record may be for UMB, LTE, Wi-Fi, WiMAX, IEEE 802.20, FLASH-OFDM®, and/or other radio technologies.

The terminal may perform acquisition for the at least one system in accordance with the at least one system record and the at least one acquisition record (block 818). The processing for acquisition may be dependent on radio technology and may include detecting for a synchronization signal or preamble, demodulating a control channel, etc. Each configurable system parameter may have multiple possible values. The terminal may perform acquisition for each system in accordance with only the at least one value for the at least one configurable system parameter in an acquisition record for that system. The terminal may perform acquisition for the at least one system periodically while it is out of service. The terminal may perform a full search for all possible values of the at least one configurable system parameter if acquisition for the at least one system is unsuccessful (block 820).

FIG. 9 shows a design of an apparatus 900 for performing system selection and acquisition. Apparatus 900 may include a module 912 to identify at least one system utilizing OFDM or SC-FDM for acquisition based on a plurality of system records for a plurality of systems, a module 914 to obtain at least one system record for the at least one system, a module 916 to obtain at least one acquisition record for the at least one system, a module 918 to perform acquisition for the at least one system in accordance with the at least one system record and the at least one acquisition record, and a module 920 to perform a full search for all possible values of the at least one configurable system parameter if acquisition for the at least one system is unsuccessful.

Figure 10:
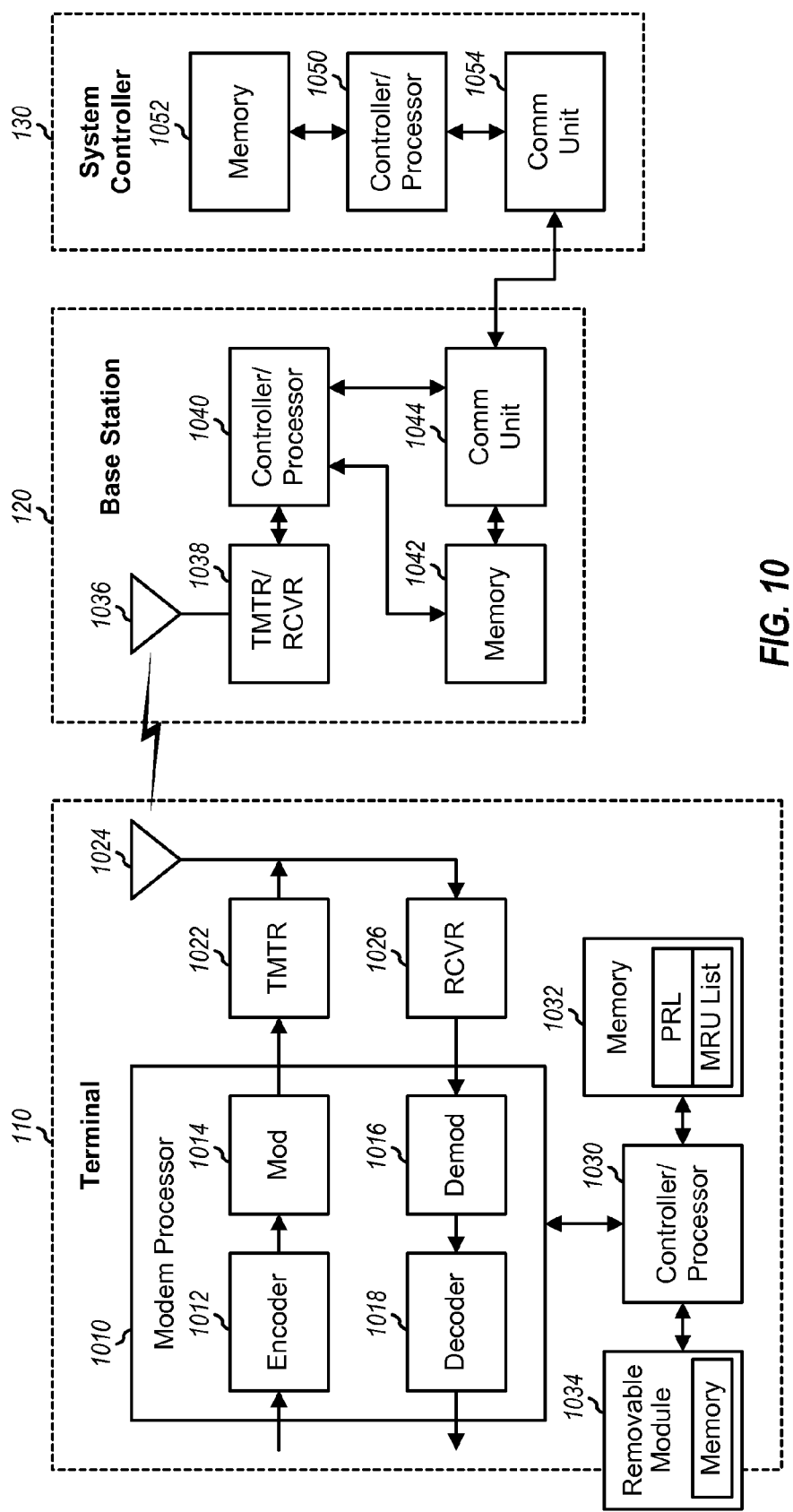
FIG. 10 shows a block diagram of a terminal, a base station, and a system controller.

FIG. 10 shows a block diagram of a design of a terminal 110, a base station 120, and system controller 130. Terminal 110 may be one of the terminals in FIG. 1, and base station 120 may be one of the base stations in FIG. 1. At terminal 110, an encoder 1012 may receive traffic data and signaling messages to be sent on the reverse link. Encoder 1012 may process (e.g., format, encode, and interleave) the traffic data and signaling messages. A modulator (Mod) 1014 may further process (e.g., symbol map and modulate) the encoded traffic data and signaling messages and provide output samples. A transmitter (TMTR) 1022 may condition (e.g., convert to analog, filter, amplify, and frequency upconvert) the output samples and generate a reverse link signal, which may be transmitted via an antenna 1024 to base station 120.

On the forward link, antenna 1024 may receive forward link signals transmitted by base station 120 and/or other base stations. A receiver (RCVR) 1026 may condition (e.g., filter, amplify, frequency downconvert, and digitize) the received signal from antenna 1024 and provide input samples. A demodulator (Demod) 1016 may process (e.g., demodulate) the input samples and provide symbol estimates. A decoder 1018 may process (e.g., deinterleave and decode) the symbol estimates and provide decoded data and signaling messages sent to terminal 110. Encoder 1012, modulator 1014, demodulator 1016, and decoder 1018 may be implemented by a modem processor 1010. These units may perform processing in accordance with the radio technology (e.g., UMB, LTE, etc.) used by the system.

A controller/processor 1030 may direct the operation of various units at terminal 110. Controller/processor 1030 may also perform or direct process 800 in FIG. 8 and/or other processes for the techniques described herein. Memory 1032 may store program codes and data for terminal 110. Memory 1032 may also store a PRL, a MRU list, and/or other files containing system records and/or acquisition records. The system and acquisition records may be used for system selection and acquisition, as described above. A removable module 1034 may include a non-volatile memory unit that may store a PRL. Removable module 1034 may be a Removable User Identity Module (R-UIM) commonly used for cdma2000, a Subscriber Identity Module (SIM) commonly used for WCDMA and GSM, a Universal Subscriber Identity Module (USIM) commonly used for WCDMA and GSM, etc.

At base station 120, a transmitter/receiver 1038 may support radio communication with terminal 110 and other terminals. A controller/processor 1040 may perform various functions for communication with the terminals. On the reverse link, the reverse link signal from terminal 110 may be received via an antenna 1036, conditioned by receiver 1038, and further processed by controller/processor 1040 to recover the traffic data and signaling messages sent by the terminal. On the forward link, traffic data and signaling messages may be processed by controller/processor 1040 and conditioned by transmitter 1038 to generate a forward link signal, which may be transmitted via antenna 1036 to terminal 110 and other terminals. Memory 1042 may store program codes and data for the base station. A communication (Comm) unit 1044 may support communication with system controller 130 and/or other network entities.

At system controller 130, a controller/processor 1050 may perform various functions to support communication services for the terminals. Controller/processor 1050 may generate and/or provide a PRL for downloading to the terminals. Controller/processor 1050 may also support over-the-air programming of the PRL using suitable messages. Memory 1052 may store program codes and data for system controller 130. A communication unit 1054 may support communication with the base stations and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
obtaining at least one acquisition record for at least one system utilizing orthogonal frequency division multiplexing (OFDM) or single-carrier frequency division multiplexing (SC-FDM), each acquisition record comprising values for multiple configurable system parameters related to bandwidth of the at least one system, wherein the multiple configurable system parameters include a fast Fourier transform (FFT) size; and
performing acquisition for the at least one system in accordance with the at least one acquisition record.

2. The method of claim 1, further comprising:
obtaining at least one system record for the at least one system, each system record comprising system identification information for an associated system and an index for an associated acquisition record, and wherein the performing acquisition comprises performing acquisition for each system in accordance with a system record and an acquisition record for the system.

3. The method of claim 2, further comprising:
identifying the at least one system for acquisition based on a plurality of system records for a plurality of systems, and wherein the obtaining the at least one system record comprises obtaining the at least one system record from among the plurality of system records.

4. The method of claim 1, wherein each of the multiple configurable system parameters has multiple possible values, and wherein the performing of acquisition comprises performing acquisition for the at least one system in accordance with the values for the multiple configurable system parameters in the at least one acquisition record for the at least one system.

5. The method of claim 4, further comprising:
performing a full search for all possible values of the multiple configurable system parameters if acquisition for the at least one system in accordance with only the values is unsuccessful.

6. The method of claim 1, wherein the performing acquisition comprises performing acquisition for the at least one system in accordance with the at least one acquisition record periodically while out of service.

7. The method of claim 1, wherein the multiple configurable system parameters further include a cyclic prefix length.

8. The method of claim 1, wherein the multiple configurable system parameters further include a number of guard subcarriers.

9. The method of claim 1, wherein each acquisition record further comprises band class and channel number information for an associated system.

10. The method of claim 1, wherein the obtaining the at least one acquisition record comprises obtaining the at least one acquisition record from a preferred roaming list (PRL) stored in a terminal or provided to the terminal.

11. The method of claim 1, wherein the obtaining the at least one acquisition record comprises obtaining the at least one acquisition record from a most recently used (MRU) list maintained by a terminal.

12. The method of claim 1, wherein the at least one acquisition record is for at least one of Ultra Mobile Broadband (UMB), Long Term Evolution (LTE), IEEE 802.11 (Wi-Fi), IEEE 802.16 (WiMAX), IEEE 802.20, and Flash-OFDM®, wireless wide area network (WWAN), wireless metropolitan area network (WMAN), wireless local area network (WLAN), and evolved universal terrestrial radio access (E-UTRA).

13. The method of claim 1, wherein the multiple configurable system parameters include a first configurable system parameter, a second configurable system parameter, and a third configurable system parameter.

14. The method of claim 13, wherein the first configurable system parameter is the FFT size of the at least one system, wherein the second configurable system parameter is a number of guard subcarriers of the at least one system, and wherein the third configurable system parameter is a cyclic prefix length of the at least one system.

15. The method of claim 14, wherein the cyclic prefix length of the at least one system is derivable from the FFT size of the at least one system.

16. An apparatus for wireless communication, comprising:
at least one processor configured to obtain at least one acquisition record for at least one system utilizing orthogonal frequency division multiplexing (OFDM) or single-carrier frequency division multiplexing (SC-FDM), each acquisition record comprising values for multiple configurable system parameters related to bandwidth of the at least one system, wherein the multiple configurable system parameters are related to processing of signals received from the at least one system, and to perform acquisition for the at least one system in accordance with the at least one acquisition record,
wherein each of the multiple configurable system parameters has multiple possible values, wherein the at least one processor is configured to perform acquisition for the at least one system in accordance with the values for the multiple configurable system parameters, and wherein the multiple configurable system parameters include a fast Fourier transform (FFT) size, a cyclic prefix length, and a number of guard subcarriers.

17. The apparatus of claim 16, wherein the at least one processor is configured to obtain at least one system record for the at least one system, each system record comprising system identification information for an associated system and an index for a corresponding acquisition record, and to perform acquisition for each system in accordance with a system record and the corresponding acquisition record for the system.

18. The apparatus of claim 16, wherein the at least one processor is configured to perform a full search for all possible values of the multiple configurable system parameters if acquisition for the at least one system in accordance with only the values is unsuccessful.

19. The apparatus of claim 16, wherein the at least one processor is configured to obtain the at least one acquisition record from a preferred roaming list (PRL) or a most recently used (MRU) list.

20. An apparatus for wireless communication, comprising:
means for obtaining at least one acquisition record for at least one system utilizing orthogonal frequency division multiplexing (OFDM) or single-carrier frequency division multiplexing (SC-FDM), each acquisition record comprising values for multiple configurable system parameters related to bandwidth of the at least one system, wherein the multiple configurable system parameters include a fast Fourier transform (FFT) size, a cyclic prefix length, and a number of guard subcarriers of the at least one system; and
means for performing acquisition for the at least one system in accordance with the at least one acquisition record,
wherein each of the multiple configurable system parameters has multiple possible values, and wherein the means for performing acquisition comprises means for performing acquisition for the at least one system in accordance with the values for the multiple configurable system parameters.

21. The apparatus of claim 20, further comprising:
means for obtaining at least one system record for the at least one system, each system record comprising system identification information for an associated system and an index for a corresponding acquisition record, and wherein the means for performing acquisition comprises means for performing acquisition for each system in accordance with a system record and the corresponding acquisition record for the system.

22. The apparatus of claim 20, further comprising:
means for performing a full search for all possible values of the multiple configurable system parameters if acquisition for the at least one system in accordance with only the values is unsuccessful.

23. The apparatus of claim 20, wherein the means for obtaining the at least one acquisition record comprises means for obtaining the at least one acquisition record from a preferred roaming list (PRL) or a most recently used (MRU) list.

24. A computer program product, comprising:
a computer-readable medium comprising:
code for causing at least one computer to obtain at least one acquisition record for at least one system utilizing orthogonal frequency division multiplexing (OFDM) or single-carrier frequency division multiplexing (SC-FDM), each acquisition record comprising values for multiple configurable system parameters related to bandwidth of the at least one system,
code for causing the at least one computer to perform acquisition for the at least one system in accordance with the at least one acquisition record, and
code for acquiring a signal transmitted by the at least one system based on the values of the multiple configurable system parameters,
wherein each of the multiple configurable system parameters has multiple possible values, wherein the code for causing the at least one computer to perform acquisition comprises code for causing the at least one computer to perform acquisition for the at least one system in accordance with the values for the multiple configurable system parameters, and wherein the multiple configurable system parameters include a fast Fourier transform (FFT) size, a cyclic prefix length, and a number of guard subcarriers.

25. The computer program product of claim 24, wherein the computer-readable medium further comprises:
code for causing the at least one computer to obtain at least one system record for the at least one system, each system record comprising system identification information for an associated system and an index for a corresponding acquisition record, and
code for causing the at least one computer to perform acquisition for each system in accordance with a system record and the corresponding acquisition record for the system.

26. The computer program product of claim 24, wherein the computer-readable medium further comprises:
code for causing the at least one computer to perform a full search for all possible values of the multiple configurable system parameters if acquisition for the at least one system in accordance with only the values is unsuccessful.

27. The computer program product of claim 24, wherein the computer-readable medium further comprises:
code for causing the at least one computer to obtain the at least one acquisition record from a preferred roaming list (PRL) or a most recently used (MRU) list.

28. A method for wireless communication, comprising:
obtaining at least one acquisition record for at least one system utilizing orthogonal frequency division multiplexing (OFDM) or single-carrier frequency division multiplexing (SC-FDM), each acquisition record comprising values for multiple configurable system parameters related to bandwidth of the at least one system, wherein the multiple configurable system parameters include a cyclic prefix length; and
performing acquisition for the at least one system in accordance with the at least one acquisition record.

29. The method of claim 28, further comprising:
obtaining at least one system record for the at least one system, each system record comprising system identification information for an associated system and an index for an associated acquisition record.

30. The method of claim 29, further comprising:
identifying the at least one system for acquisition based on a plurality of system records for a plurality of systems, wherein the obtaining of the at least one system record comprises obtaining the at least one system record from among the plurality of system records.

31. The method of claim 28, wherein each acquisition record further comprises band class and channel number information for an associated system.

32. The method of claim 28, wherein the obtaining of the at least one acquisition record comprises obtaining the at least one acquisition record from a preferred roaming list (PRL) stored in a terminal or provided to the terminal.

33. A method for wireless communication, comprising:
obtaining at least one acquisition record for at least one system utilizing orthogonal frequency division multiplexing (OFDM) or single-carrier frequency division multiplexing (SC-FDM), each acquisition record comprising values for multiple configurable system parameters related to bandwidth of the at least one system, wherein the multiple configurable system parameters include a number of guard subcarriers; and
performing acquisition for the at least one system in accordance with the at least one acquisition record.

34. The method of claim 33, further comprising:
obtaining at least one system record for the at least one system, each system record comprising system identification information for an associated system and an index for an associated acquisition record.

35. The method of claim 34, further comprising:
identifying the at least one system for acquisition based on a plurality of system records for a plurality of systems, wherein the obtaining of the at least one system record comprises obtaining the at least one system record from among the plurality of system records.

36. The method of claim 33, wherein each acquisition record further comprises band class and channel number information for an associated system.

* * * * *